(12) United States Patent
Fukano

(10) Patent No.: US 6,948,521 B2
(45) Date of Patent: Sep. 27, 2005

(54) CHECK VALVE DEVICE (75) Inventor: Yoshihiro Fukano, Moriya (JP)

(73) Assignee: SMC Kabushiki Kaisha, Tokyo (JP)

( * ) Notice: Subject to any disclaimer, the term of this patent is extended or adjusted under 35 U.S.C. 154(b) by 222 days.

(21) Appl. No.: 10/420,780

(22) Filed: Apr. 23, 2003

(65) Prior Publication Data
US 2003/0201012 A1 Oct. 30, 2003

(30) Foreign Application Priority Data
Apr. 30, 2002 (JP) ........................................ 2002-128401

(51) Int. Cl.⁷ .............................................. F16K 15/02
(52) U.S. Cl. ............... 137/515.5; 137/535; 137/543.19; 251/337; 251/368
(58) Field of Search ............................. 137/515.5, 535, 137/543.19, 859; 251/337, 368

(56) References Cited
U.S. PATENT DOCUMENTS

| | | | | |
|---|---|---|---|---|
| 1,227,759 A | * | 5/1917 | Day ............................. | 137/535 |
| 1,246,892 A | * | 11/1917 | Donnelly ..................... | 137/535 |
| 2,758,609 A | * | 8/1956 | Dickert et al. ............... | 137/859 |
| 2,848,157 A | * | 8/1958 | Ayling .......................... | 137/535 |
| 3,084,707 A | * | 4/1963 | Frye ............................. | 137/859 |
| 3,176,712 A | * | 4/1965 | Ramsden ..................... | 137/859 |
| 3,302,662 A | * | 2/1967 | Webb ..................... | 137/543.19 |
| 3,749,123 A | * | 7/1973 | Fletcher et al. ............. | 137/535 |
| 4,062,378 A | * | 12/1977 | Bender ........................ | 137/535 |
| 4,298,023 A | * | 11/1981 | McGinnis .................... | 137/535 |
| 4,712,583 A | * | 12/1987 | Pelmulder et al. .......... | 137/859 |
| 5,727,594 A | * | 3/1998 | Choksi ........................ | 137/859 |
| 5,873,385 A | * | 2/1999 | Bloom et al. .......... | 137/543.19 |

* cited by examiner

Primary Examiner—John Rivell
(74) Attorney, Agent, or Firm—Paul A. Guss (57) ABSTRACT A check valve device includes a valve section of a valve plug arranged in a fluid passage of a body, the valve plug being in a valve-opened state when separated from a seat section, and the valve plug being in a valve-closed state when seated on the seat section, and an elastic member which urges the valve section by the spring property of bent spring sections so that the valve section is seated on the seat section. The body, the valve plug, and the elastic member are formed of resin materials.

13 Claims, 7 Drawing Sheets

CHECK VALVE DEVICE

BACKGROUND OF THE INVENTION

1. Field of the Invention

The present invention relates to a check valve device which makes it possible to flow a pressure fluid in only one direction through a fluid passage and which makes it possible to prevent the pressure fluid from flowing in the opposite direction.

2. Description of the Related Art

A check valve is used for flowing a pressure fluid in only one direction and preventing the pressure fluid from flowing in the opposite direction in a fluid circuit.

Figure 7:
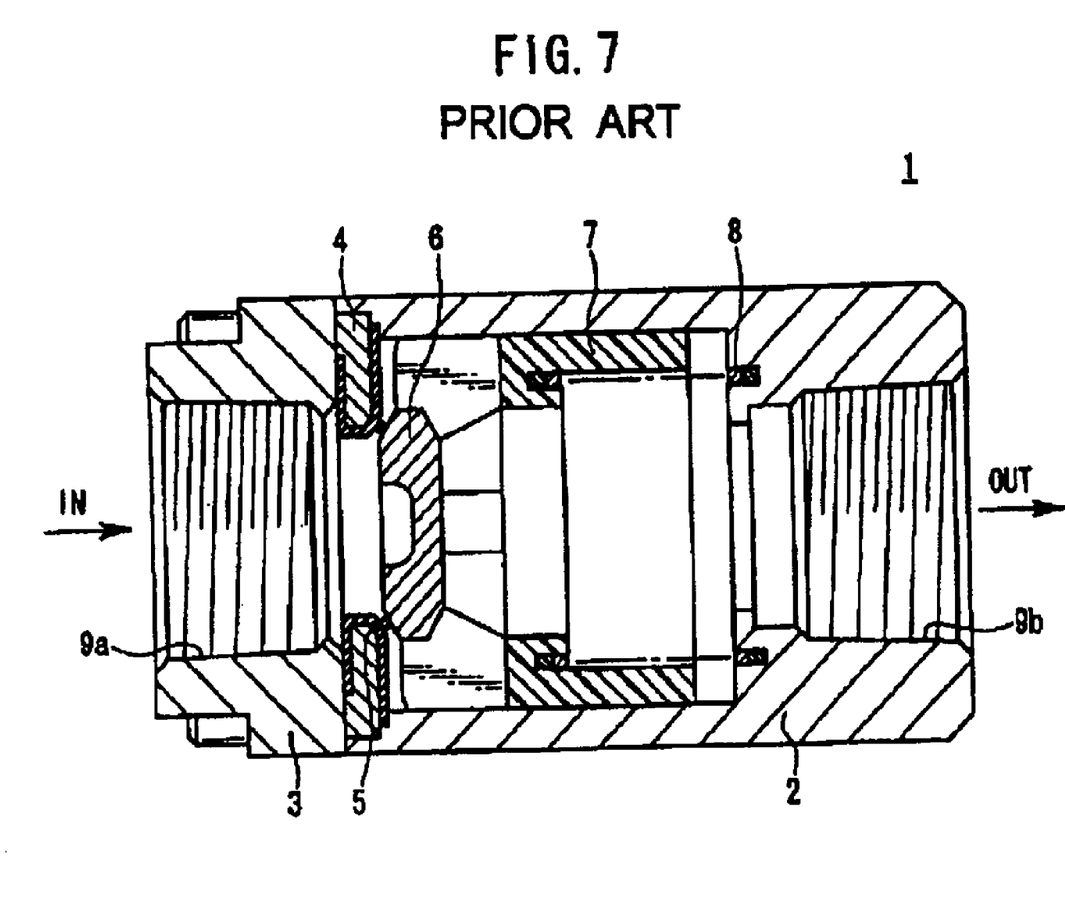
FIG. 7 is a longitudinal sectional view in the axial direction illustrating a conventional check valve.

FIG. 7 shows such a conventional check valve. The check valve 1 includes a body 2 and a cover 3 which are connected to form a substantially cylindrical shape, and a seat ring 4 interposed at the connecting portion between the body 2 and the cover 3.

The check valve 1 further includes a seat section 5 of a rubber material covering the seat ring 4, a valve plug 6 which is capable of being seated on the seat section 5, a spring-receiving member 7 contacting the valve plug 6 and provided slidably along the inner wall surface of the body 2, and a spring member 8 of metal for pressing the valve plug 6 against the seat section 5 by being fastened by the spring-receiving member 7.

An explanation will be made briefly about the operation of the conventional check valve 1. The pressure fluid inflowing from a first port 9a in the cover 3 presses the valve plug 6 in the right direction in FIG. 7. The valve plug 6 is displaced against the spring force of the spring member 8 by the pressure fluid, and thus the valve plug 6 is separated from the seat section 5 in the valve-opened state. Therefore, the pressure fluid inflowing from the first port 9a in the cover 3 passes through the gap between the seat section 5 and the valve plug 6, and the pressure fluid outflows from a second port 9b disposed in the body 2.

When the pressure fluid inflows from the second port 9b disposed in the body 2 reversely to the above, the pressure fluid presses the valve plug 6 against the seat section 5. Therefore, the pressure fluid is prevented from flowing from the second port 9b in the body 2 toward the first port 9a in the cover 3.

For example, when the conventional check valve as described above is incorporated into a semiconductor manufacturing apparatus through which liquid chemical or the like flows, some iron rust or the like may appear, or some harmful influence may be exerted on the component of the flowing liquid chemical. This is because the spring member made of metal is exposed in the passage.

SUMMARY OF THE INVENTION

A general object of the present invention is to provide a check valve device which makes it possible to prevent the pressure fluid such as a liquid chemical flowing through a fluid passage from harmful effect.

According to the present invention, all constituent elements arranged in a fluid passage including an elastic member for urging a valve plug toward a seat section are formed of resin materials. Accordingly, for example, even when a liquid chemical or the like is used as pressure fluid, the check valve device can be used appropriately without any harmful influence on the component of the liquid chemical.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
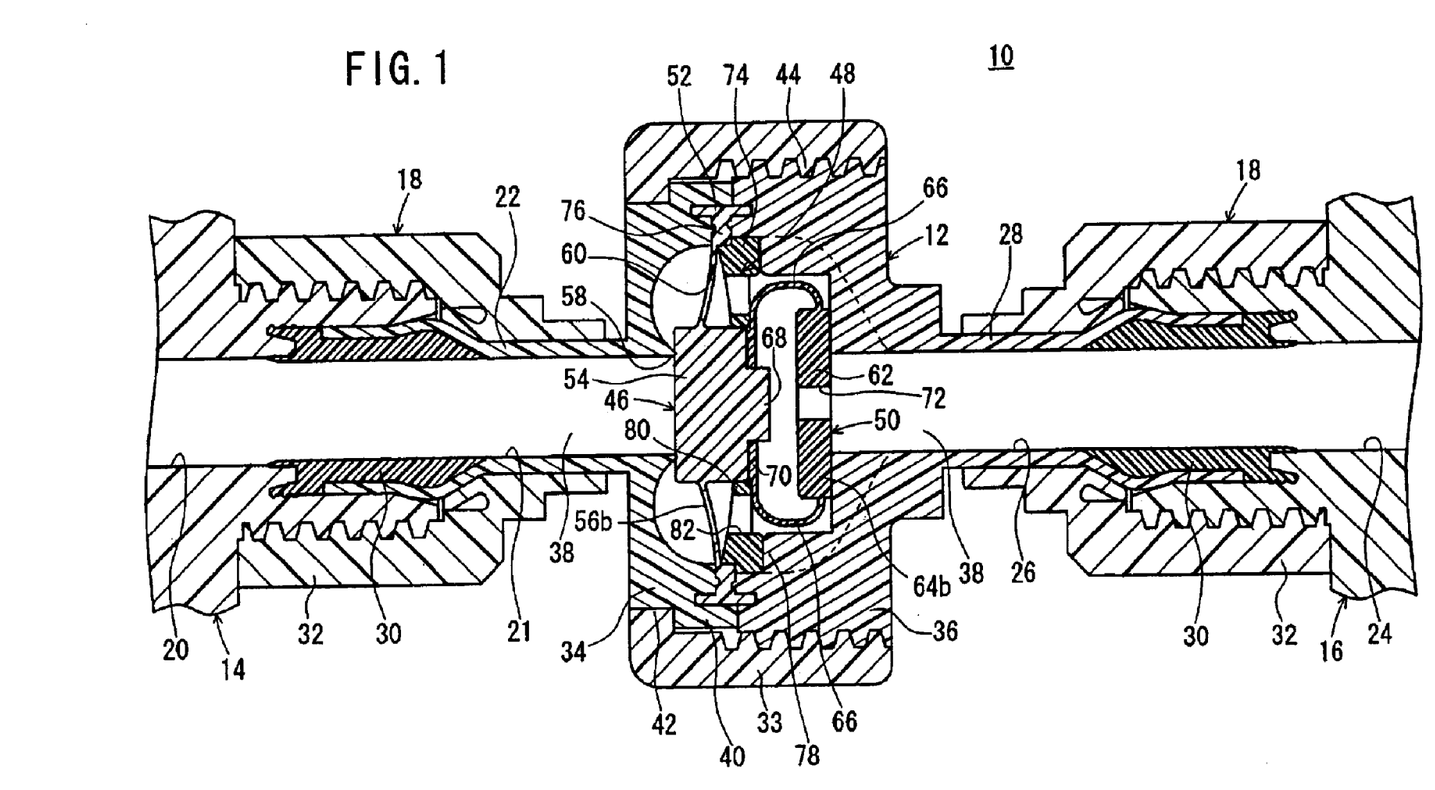
FIG. 1 is a longitudinal sectional view in the axial direction illustrating a check valve device according to an embodiment of the present invention.

With reference to FIG. 1, reference numeral 10 indicates a check valve device according to an embodiment of the present invention.

The check valve device 10 comprises a body 12 and joint sections 18. The body 12 has a substantially disk-shaped configuration. The joint sections 18 are separated from each other by a predetermined distance on both sides of the body 12. The joint sections 18 are detachably connected to other fluid pressure-operated apparatuses 14, 16. All parts of the body 12 and the joint sections 18 are formed of resin materials.

The joint section 18 has a first port 21 communicating with a fluid passage 20 of the fluid pressure-operated apparatus 14. The joint sections 18 include a first tube section 22 which protrudes by a predetermined length from the body 12, and a second tube section 28 which is provided coaxially with the first tube section 22 on the opposite side of the body 12 and which is formed with a second port 26 for communicating with a fluid passage 24 of the other fluid pressure-operated apparatus 16.

Each of the joint sections 18 further includes an inner member 30 which is inserted into diametrally expanded one end of each of the first and second tube sections 22, 28, and a lock nut 32 which is screwed into a screw groove engraved on each of the fluid pressure-operated apparatuses 14, 16 so that the liquid-tightness is retained at the connecting portions between the first and second tube sections 22, 28 and the fluid pressure-operated apparatuses 14, 16, respectively.

The body 12 comprises a first valve block 34 and a second valve block 36 which are coupled integrally by a ring-shaped nut member 33. A fluid passage 38 is formed through the first and second valve blocks 34, 36 for communicating with the first port 21 and the second port 26.

The nut member 33 has a fastening section 42 which is fastened by an annular projection 40 of the first valve block 34, and a screw section 44 which is screwed with a screw section engraved on the outer circumferential surface of the second valve plug 36.

Figure 2:
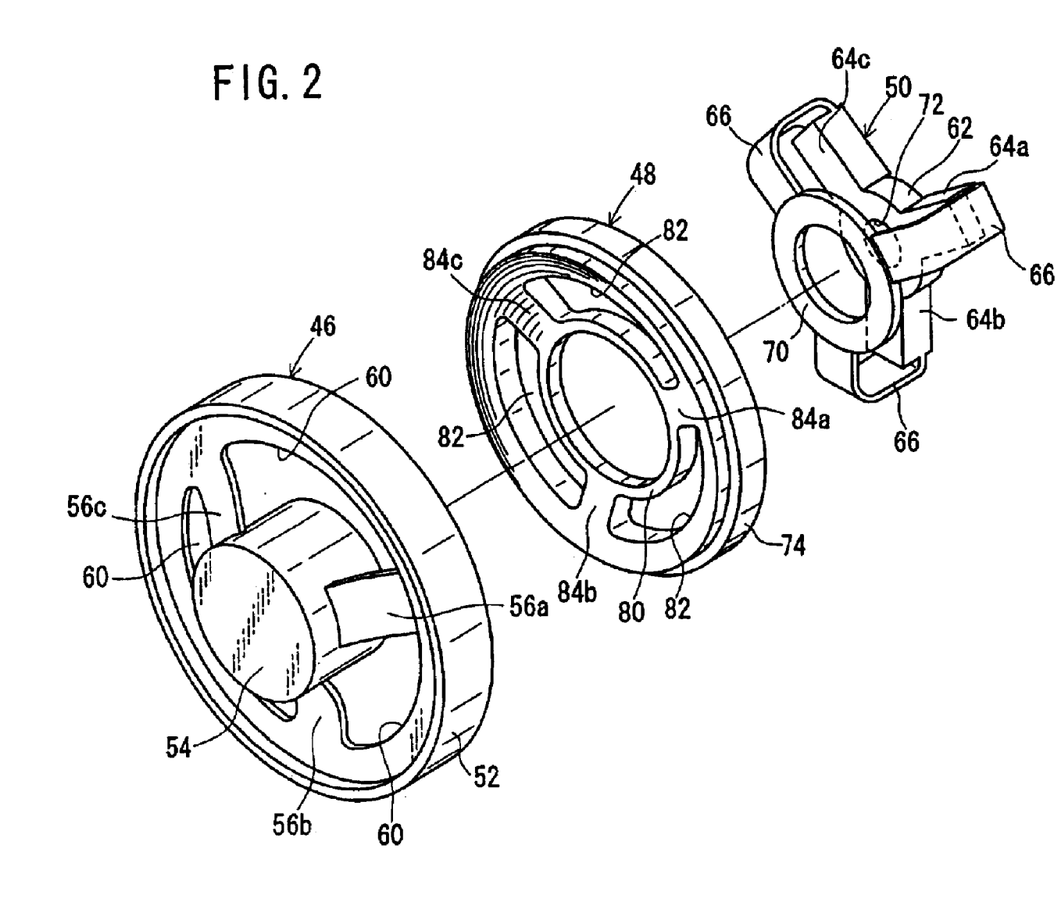
FIG. 2 is a perspective view illustrating a valve plug, a support member, and an elastic member arranged in the check valve device shown in FIG. 1.

In the fluid passage 38 formed in the body 12, a valve plug 46, a support member 48, and an elastic member 50 are arranged in the order named in a direction from the first port 21 to the second port 26 (see FIG. 2). The valve plug 46, the support member 48, and the elastic member 50 are formed of resin materials. The elastic member 50 is preferably formed of, for example, PTFE (polytetrafluoroethylene).

The valve plug 46 comprises a poppet valve. As shown in FIGS. 1 and 2, the valve plug 46 includes an annular section 52 interposed between the first valve block 34 and the second valve block 36, a substantially columnar and thick-walled valve section 54 formed at a central portion of the annular section 52, and a plurality of thin-walled sections 56a to 56c separated from each other by predetermined angles in the circumferential direction for connecting the annular section 52 and the valve section 54. The annular section 52, the valve section 54, and the thin-walled sections 56a to 56c are integrally formed of resin material.

Figure 3:
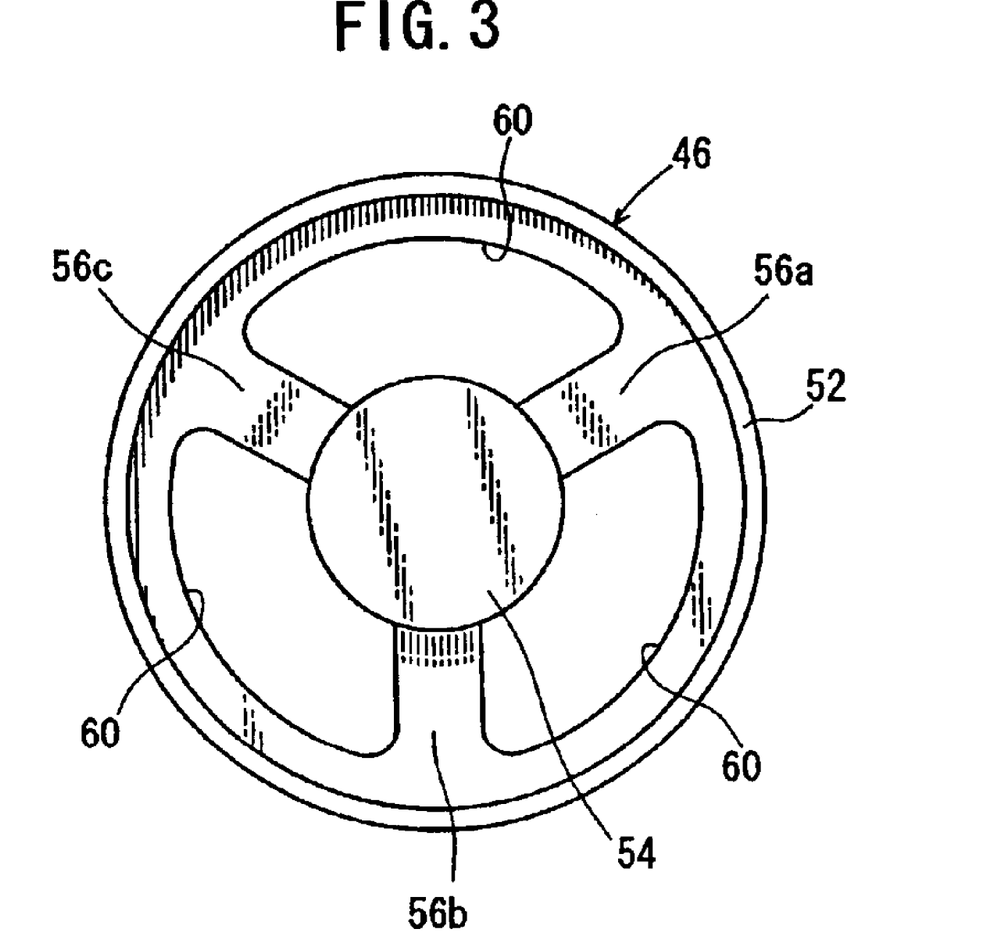
FIG. 3 is a plan view illustrating the valve plug shown in FIG. 2.

In this arrangement, the valve section 54 is capable of being seated on or separated from a seat section 58 of an annular projection formed on the first valve block 34 when the thin-walled sections 56a to 56c are bent. The valve is closed (valve-closed state) when the valve section 54 is seated on the seat section 58, and the valve is opened (valve-opened state) when the valve section 54 is separated from the seat section 58. In the valve-opened state, the pressure fluid such as a liquid chemical flows through gaps 60 (see FIGS. 2 and 3) formed between the adjoining thin-walled sections 56a to 56c.

The elastic member 50 is arranged in the fluid passage 38 formed in the body 12, for pressing the valve section 54 of the valve plug 46 toward the seat section 58 by the spring force.

Figure 5:
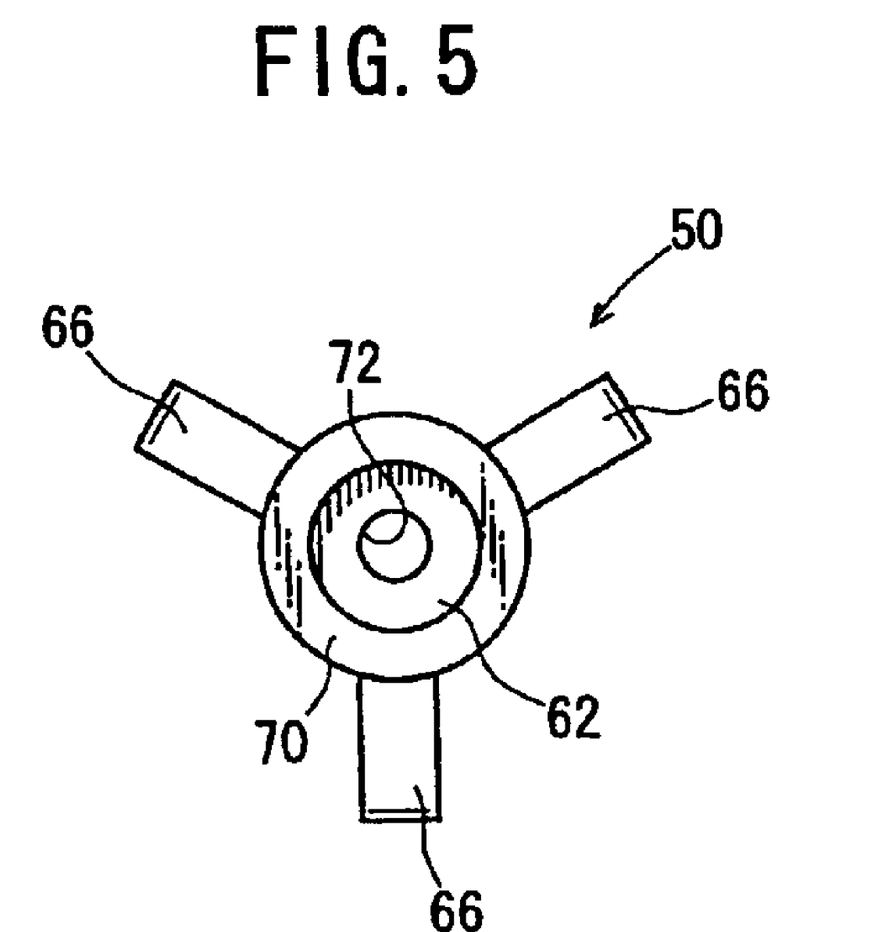
FIG. 5 is a plan view illustrating the elastic member shown in FIG. 2.

As shown in FIGS. 2 and 5, the elastic member 50 comprises three legs 64a to 64c, spring sections 66, and an annular member 70. The legs 64a to 64c extend radially outwardly from a central ring member 62 and are thick-walled while having angles of separation of about 120 degrees in the circumferential direction. The spring sections 66 are bent toward the central ring member 62 from the respective ends of the three legs 64a to 64c to have the spring property thereby and are thin-walled as compared with the legs 64a to 64c. The annular member 70 is connected to the ends of the spring sections 66 and is installed to a projection 68 of the valve section 54 (see FIG. 1).

In this arrangement, the legs 64a to 64c of the elastic member 50 contact the inner wall surface of the second valve block 36 (see FIG. 1). The valve section 54 is displaced together with the annular member 70. Therefore, the valve section 54 of the valve plug 46 is pressed by the spring force of the spring section 66 of the elastic member 50 so that the valve section 54 of the valve plug 46 is seated on the seat section 58.

A penetrating hole 72 is formed at a central portion of the ring member 62 to which the legs 64a to 64c are integrally connected.

The support member 48 is interposed between the valve plug 46 and the elastic member 50 for protecting the thin-walled sections 56a to 56c of the valve plug 46 and the spring sections 66 of the elastic member 50. The support member 48 has an outer circumferential section 74 interposed between a step section 76 on the annular section 52 of the valve plug 46 and an annular projection 78 of the second valve block 36 (see FIG. 1). An inner circumferential section 80 of the support member 48 is provided slidably in the axial direction along the outer circumferential surface of the valve section 54 of the valve plug 46.

Figure 4:
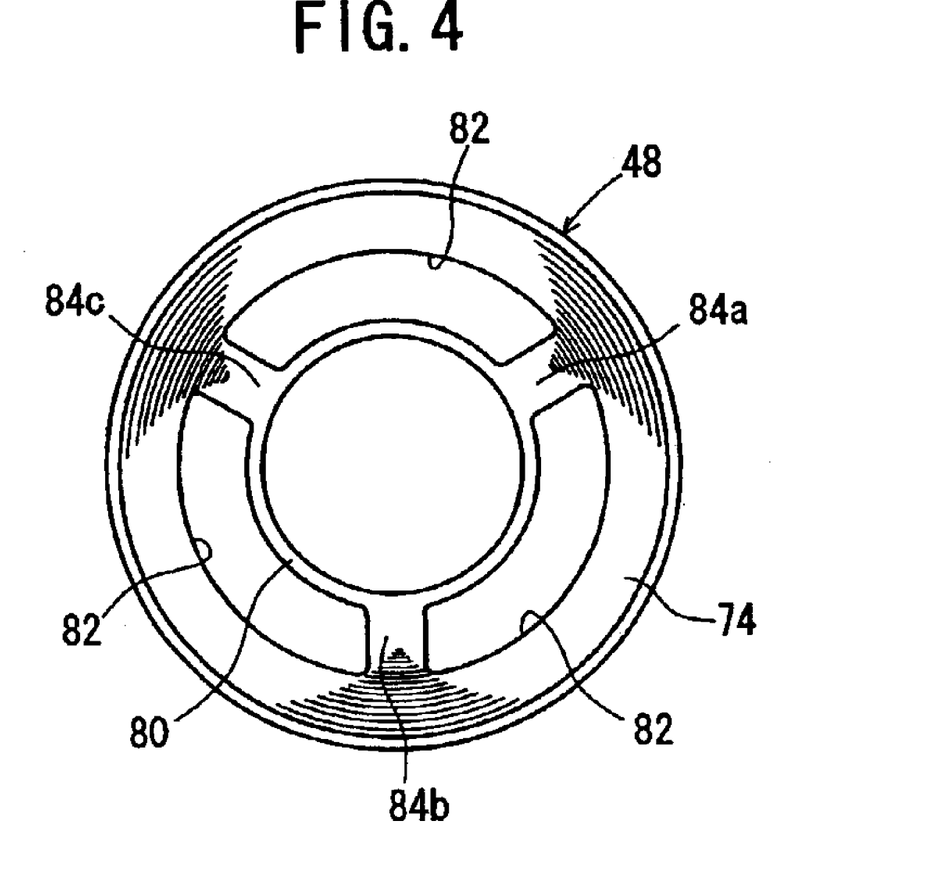
FIG. 4 is a plan view illustrating the support member shown in FIG. 2.

A plurality of gaps 82 having a circular arc-shape are formed between the outer circumferential section 74 and the inner circumferential section 80 of the support member 48 (see FIG. 4).

Figure 6:
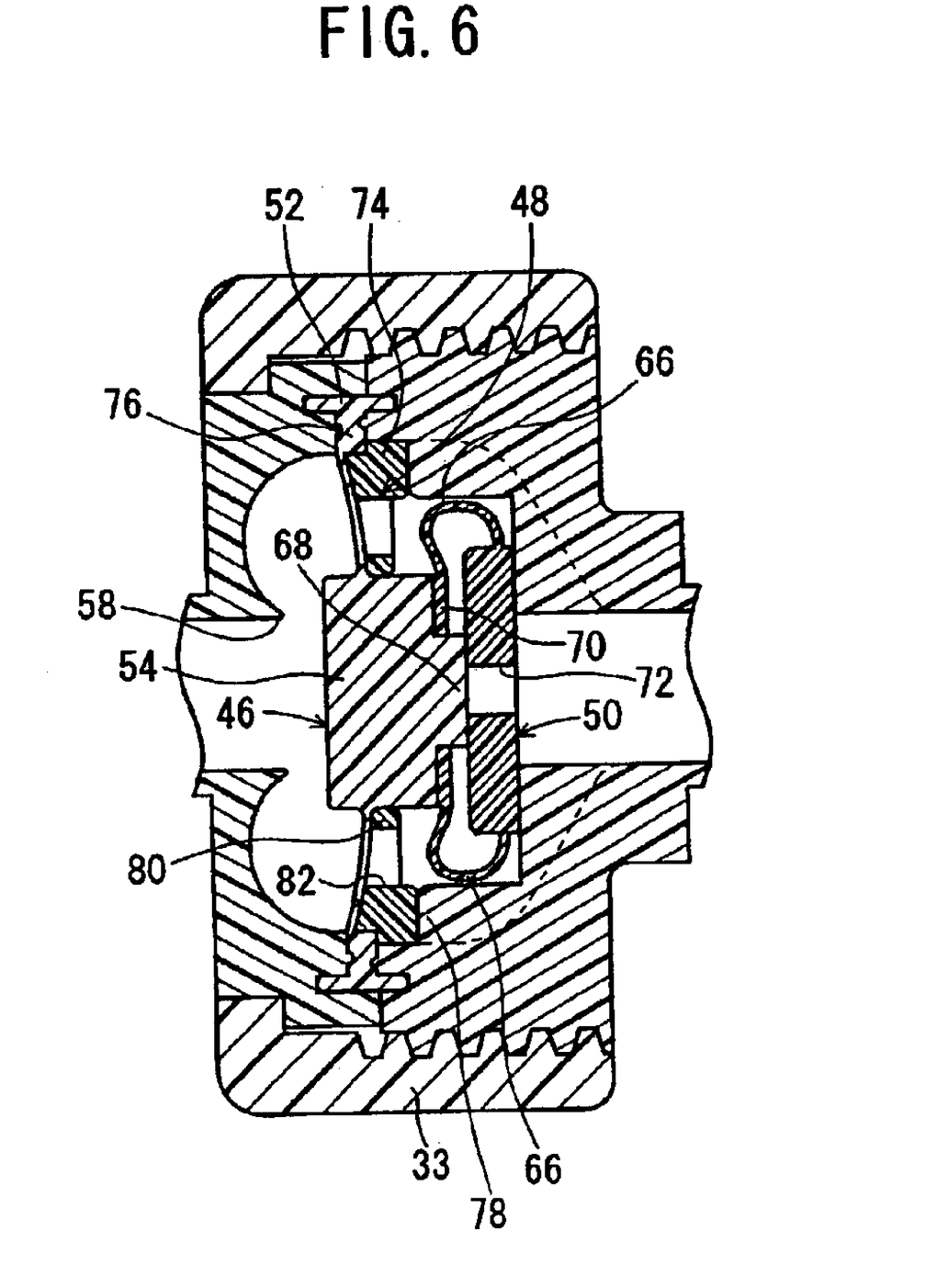
FIG. 6 is, with partial omission, a longitudinal sectional view illustrating the valve-opened state when the valve plug is displaced, starting from the valve-closed state shown in FIG. 1.

When the valve plug 46 is in the valve-closed state, the inner circumferential section 80 of the support member 48 contacts the boundary portions between the spring sections 66 and the annular member 70 of the elastic member 50 as shown in FIG. 1. On the other hand, as shown in FIG. 6, when the valve plug 46 is in the valve-opened state, the inner circumferential section 80 of the support member 48 is separated from the boundary portions and slides in the axial direction of the valve section 54 to contact the boundary portions between the valve section 54 and the thin-walled sections 56a to 56c. Further, intermediate sections 84a, 84c contact the thin-walled sections 56a to 56c of the valve plug 46. The intermediate sections 84a, 84c extend from the inner circumferential section 80 to the outer circumferential section 74.

The support member 48 has the inner circumferential section 80 that is displaceable in the axial direction of the valve section 54 corresponding to the valve-opened state or the valve-closed state of the valve plug 46. Accordingly, the flexible thin-walled sections 56a to 56c of the valve plug 46 and the spring sections 66 of the elastic member 50 are protected appropriately. Therefore, it is possible to improve the durability.

The check valve device 10 according to the embodiment of the present invention is basically constructed as described above. Next, its operation, function, and effect will be explained.

The following explanation will be made assuming that the valve-closed state, in which the valve plug 46 is seated on the seat section 58 as shown in FIG. 1, is designated as an initial position.

Starting from the initial position, the pressure fluid such as a liquid chemical is supplied via the first port 21 of the first tube section 22 connected to the projection of the fluid pressure-operated apparatus 14. The pressure fluid comes along the passage 38, and thus the pressure fluid presses the valve section 54 of the valve plug 46 arranged in the body 12 in the right direction in FIG. 1.

When the pressing force of the pressure fluid overcomes the spring force of the spring sections 66 of the elastic member 50, the valve section 54 is separated from the seat section 58 to be the valve-opened state as shown in FIG. 6. The pressure fluid flows through the gap generated between the seat section 58 and the valve section 54. Further, the pressure fluid passes through the gaps 60 formed through the valve plug 46, the plurality of gaps 82 formed through the support member 48, and the hole 72 of the elastic member 50, and the pressure fluid is discharged from the second port 26 to the other fluid pressure-operated apparatus 16.

The pressure fluid such as a liquid chemical supplied from the first port 21 further bends the spring sections 66 of the elastic member 50, so that the annular member 70 connected to the valve section 54 approaches the legs 64a to 64c. Then, the valve section 54 of the valve plug 46 is separated from the seat section 58. Accordingly, the first port 21 communicates with the second port 26, and the pressure fluid is discharged from the second port 26 to the fluid pressure-operated apparatus 16.

If the pressure fluid is supplied from the second port 26 of the second tube section 28 reversely to the above, the valve section 54 of the valve plug 46 is seated on the seat section 58. Therefore, the pressure fluid is prevented from flowing toward the first port 21.

In the embodiment of the present invention, all of the constituent elements are formed of the resin materials in the fluid passage 38 through which the pressure fluid such as a liquid chemical flows. Accordingly, it is possible to prevent the component of the liquid chemical or the like from being harmfully affected.

In this arrangement, the elastic member 50 is formed of the resin material, and the thin-walled bent sections having spring property, i.e., the spring sections 66 are formed between the annular member 70 installed to the valve section 54 and the legs 64a to 64c contacting the second valve block 36. Accordingly, it is possible to achieve the similar function of the conventional return spring.

Further, the support member 48 is provided between the valve plug 46 and the elastic member 50 to appropriately protect the spring sections 66 of the elastic member 50 of the resin material. Accordingly, it is possible to improve the durability.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A check valve device comprising:
    a body having a fluid passage communicating with a first port and a second port;
    a valve plug arranged in said fluid passage of said body, said valve plug being in a valve-opened state when separated from a seat section, and said valve plug being in a valve-closed state when seated on said seat section; and
    an elastic member arranged in said fluid passage of said body and urging said valve plug so that said valve plug is seated on said seat section,
    wherein said body, said valve plug, and said elastic member are formed of resin materials, said elastic member includes a central ring member, a plurality of legs extending radially outwardly from said central ring member, said central ring member and said plurality of legs lying in a common plane, spring sections bent from ends of said legs, said spring sections being thin-walled as compared with said legs, and an annular member connected to ends of said spring sections, and said annular member installed to said valve plug is capable of approaching said legs or separating from said legs when said spring sections bend.

2. The check valve device according to claim 1, wherein a support member of a resin material is interposed between said valve plug and said elastic member, and said support member includes an outer circumferential section, an inner circumferential section, and a plurality of intermediate sections which integrally connect said outer circumferential section and said inner circumferential section.

3. The check valve device according to claim 2, wherein said inner circumferential section of said support member is provided displaceably in an axial direction of a valve section formed on said valve plug corresponding to said valve-opened state or said valve-closed state of said valve plug.

4. The check valve device according to claim 2, wherein gaps are formed between said outer circumferential section and said inner circumferential section of said support member, and a pressure fluid flows through said gaps when said valve plug is in said valve-opened state.

5. The check valve device according to claim 1, wherein said body includes a first valve block and a second valve block which are coupled to one another by a ring-shaped nut member.

6. The check valve device according to claim 5, wherein said valve plug includes an annular section interposed between said first valve block and said second valve block, a substantially columnar valve section arranged at a central portion of said annular section, and a plurality of thin-walled sections separated from each other by predetermined angles in a circumferential direction for connecting said annular section and said valve section.

7. The check valve device according to claim 6, wherein gaps are formed between said adjoining thin-walled sections, and a pressure fluid flows through said gaps when said valve plug is in said valve-opened state.

8. A check valve device comprising:
    a body having a fluid passage communicating with a first port and a second port;
    a valve plug arranged in said fluid passage of said body, said valve plug being in a valve-opened state when separated from a seat section, and said valve plug being in a valve-closed state when seated on said seat section; and
    an elastic member arranged in said fluid passage of said body and urging said valve plug so that said valve plug is seated on said seat section,
    wherein said body, said valve plug, and said elastic member are formed of resin materials, said elastic member includes a plurality of legs, spring sections bent from ends of said legs, and an annular member connected to ends of said spring sections, and said annular member installed to said valve plug is capable of approaching said legs or separating from said legs when said spring sections bend, and
    wherein a support member of a resin material is interposed between said valve plug and said elastic member, and said support member includes an outer circumferential section, an inner circumferential section, and a plurality of intermediate sections which integrally connect said outer circumferential section and said inner circumferential section.

9. The check valve device according to claim 8, wherein said inner circumferential section of said support member is provided displaceably in an axial direction of a valve section formed on said valve plug corresponding to said valve-opened state or said valve-closed state of said valve plug.

10. The check valve device according to claim 8, wherein gaps are formed between maid outer circumferential section and said inner circumferential section of said support member, and a pressure fluid flows through said gaps when said valve plug is in said valve-opened state.

11. The check valve device according to claim 8, wherein said body includes a first valve block and a second valve block which are coupled to one another by a ring-shaped nut member.

12. The check valve device according to claim 11, wherein said valve plug includes an annular section interposed between said first valve block and said second valve block, a substantially columnar valve section arranged at a central portion of said annular section, and a plurality of thin-walled sections separated from each other by predetermined angles in a circumferential direction for connecting said annular section and said valve section.

13. The check valve device according to claim 12, wherein gaps are formed between said adjoining thin-walled sections, and a pressure fluid flows through said gaps when said valve plug is in said valve-opened state.

* * * * *